June 17, 1958     M. R. SACKETT     2,839,627
LEVEL SENSITIVE SWITCHING MEANS
Filed May 18, 1953     2 Sheets-Sheet 1
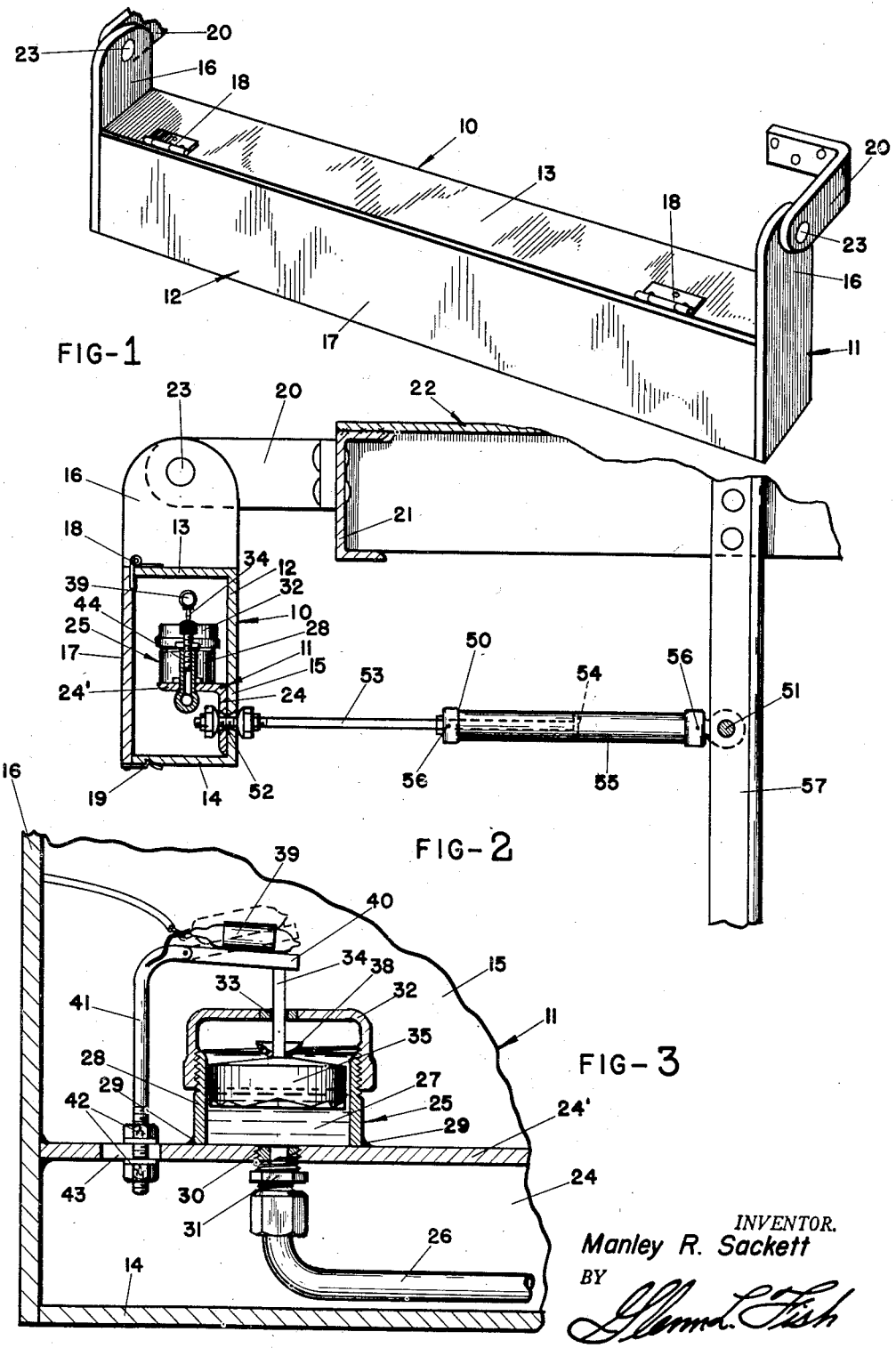
INVENTOR.
Manley R. Sackett
BY
ATTORNEY June 17, 1958    M. R. SACKETT    2,839,627
LEVEL SENSITIVE SWITCHING MEANS
Filed May 18, 1953    2 Sheets-Sheet 2

INVENTOR
Manley R. Sackett
BY
Glenn L. Fish
ATTORNEY

United States Patent Office 2,839,627
Patented June 17, 1958

2,839,627

LEVEL SENSITIVE SWITCHING MEANS

Manley R. Sackett, Spokane, Wash.

Application May 18, 1953, Serial No. 355,840

6 Claims. (Cl. 200—61.52)

This invention is a level sensitive switching means of the type adapted for application to mobile equipment and the method of controlling leveling mechanisms for correcting the vertical tilt of the equipment in one direction.

One object of the invention lies in the provision of a level sensitive switch actuator carried by a pendulous frame swivel mounted on a normally horizontal fixed axis and adapted to correct the vertical tilt in a plane parallel with said axis.

Another object of the invention lies in the provision of a level sensitive switch actuator having a pendulous frame swivel mounted on a normally horizontal fixed axis disposed parallel with the plane of vertical tilt to be corrected and having an arrester to decelerate its swivel movement effected by vertical tilt in a plane lateral to said axis.

Another object of the invention lies in the provision of a manually operable liquid surface level adjusting device for selectively controlling the level of the liquid forming a part of the level sensitive switching means.

Another object of the invention lies in the provision of a level sensitive switching means having spaced reservoirs containing a liquid and intercommunicated for free-running-between of the liquid and adapted to actuate an electric switch.

Another object of the invention is to generally improve level sensitive control means for leveling devices of mobile equipment.

Yet another object of the invention lies in the method of dampening movements of the liquid actuated floats.

These and other objects of the invention will become apparent during the course of the following description.

In the accompanying drawings, forming a part of this specification, and in which like numerals are employed to designate like parts:

Figure 1 is a view in perspective showing the improved level sensitive switching means;

Figure 2 is a transverse cross section taken through the pendulous frame and a portion of the equipment structure from which the device is supported;

Figure 3 is an enlarged fragmentary longitudinal vertical cross section showing one reservoir and associated elements;

Figure 4:
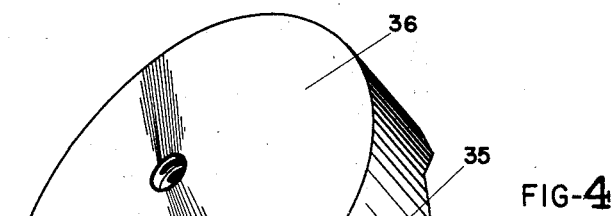
Figure 4 is a perspective view of a float showing the top and one side.

According to the exemplifying drawings, the invention is illustrated in a preferred embodiment as a level sensitive switching means indicated in general by the numeral 19 and having a pendulous frame 11 which is preferably provided with a housing 12 comprising top wall 13, bottom wall 14, and rear wall 15 secured together along their meeting longitudinal edges and at their ends by vertical end plates 16 which extend upwardly above top wall 13. The front wall 17 is hinged at 18 to the top wall 13 and is provided with a conventional latching means indicated at 19, thus forming a closed access opening to the frame 11.

The frame 11 is supported by horizontal brackets 20 which are riveted or otherwise secured to a structural member 21 of the mobile equipment indicated by the numeral 22. The free ends of the brackets 20 and the upper ends of the end wall 16 are drilled and journal pins 23 are disposed therein to swivel mount the pendulous frame 11. The journal pins 23 are coaxial and their axis is supported disposed parallel with the plane of tilt to be corrected of the mobile equipment.

Presently the device is operated on harvesters of the self-propelled type and is primarily designed for the purpose of actuating the harvester's leveling mechanism to correct any transverse tilt of the machine, thus maintaining the harvester substantially level during harvesting operations. However, it is not my intention to limit the scope of my invention, and I desire to secure Letters Patent for all uses of which the device disclosed is susceptible limited only as expressly stated in the appended claims.

The frame 11 comprises end walls 16 and an elongated angle metal 24 disposed parallel with the axis of journals 23 and having a lip 24' extending horizontally and another vertically.

Carried by the horizontal lip 24' of member 24 are a pair of upright reservoirs 25 disposed one adjacent each end of the member 24 and the reservoirs are intercommunicated by means of a conduit 26 extending therebetween and disposed below the reservoirs. The conduit 26 is communicated with the reservoir by forming an internally threaded vertical aperture 30 through the horizontal lip of member 24 and applying a conventional connector as 31.

A liquid, indicated by the numeral 27 and preferably mercury, is contained within the reservoirs and is free-flowing through the conduit 26 to run between said reservoirs to seek a level in the course of tilting movement of the frame.

As illustrated more particularly in Figure 3, each reservoir comprises a section of pipe nipple 28 which is hermetically welded at 29 to the horizontal lip 24' and is provided with a removable closure cap 32 which is threadedly engaged to the upper end of the nipple 28 and provided with a bearing sleeve 33 coaxial with the top and adapted to receive an upwardly projecting vertical rod 34 which extends through the reservoir's cap 32.

Figure 5:
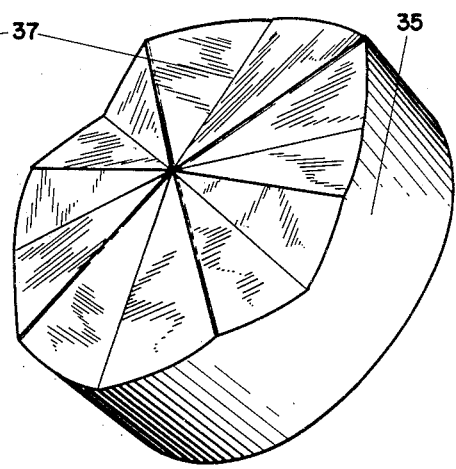
Figure 5 is a perspective view of a float showing the bottom and one side.

On the lower end of rods 34 I have provided floats 35. The floats 35 are each constructed as shown in Figures 4 and 5 and are cylindrical. The upper face 36 of each float is substantially conical providing an angled surface upon which any liquid splashed or otherwise placed thereon may flow back to the liquid body supporting the float. The lower face 37 is provided with radially disposed undulations, thus insuring free flow of the liquid into and out of the reservoirs 25 even though the floats may be resting upon the surface of the horizontal lip 24'.

When using mercury as the liquid, the float may be formed of any one of a number of materials or combinations or alloys thereof and will operate most effectively when the float is formed of a material having the specific gravity of copper or less. The type of material from which the float will be formed will vary according to the lag desired between the actual tilting of the machine and the actuation of the leveling mechanism. This will vary also by the physical distance between the reservoirs 25 since the vertical distance between the reservoirs at any given degree of tilt will be greater when the reservoirs are spaced a greater distance apart than will be found when they are closer together. Another factor in the speed of movement is the size of the opening in the sleeve 33 relative to the diameter of rod 34 as it is necessary that air within the reservoir 25 and above the liquid surface, to some extent, be vented to permit free flowing of the liquid 27. When the material used to form the float 35 is, for example, brass or bronze, the surge of inflowing liquid 27 will be less effective in raising the float as it is in the event aluminum is used in forming the float. The specific gravity of mercury is approximately 13.5 while the specific gravity of brass is 8.5 and that of aluminum is 2.6. Any of the metals which are found to have a specific gravity lighter than mercury will function when the conditions are all correct for the specific float material. When the distance between the reservoirs 25 is approximately three feet or under with reservoirs of three inches diameter and a conduit of approximately one-half inch I. D., an aluminum float has been found to operate effectively in some cases.

To prevent the liquid from raising in the reservoir 25 to such a degree as will cause it to flow out of the bearing sleeves 33 about the rod 34, I have provided concavo convex resilient cups 38 which encircle the rod 34 and rest upon the top of the floats 35 and seal against the cap 32 of the reservoir 25 when the float is raised by the liquid 27.

To effect proper operation of the switches 39, it is necessary to adjust the switch actuating arms 40 relative to the upper end of the float rods 34. This is accomplished by two methods; one for major adjustments and one for minor adjustments. In the major adjustment means I have provided an upstanding support arm 41 which is vertically and horizontally adjustable by means of companion clamping nuts 42 threadedly engaged on the lower end of the support arm 41 and disposed one on either side of the horizontal lip 24'. The lip 24' has a slot 43 disposed parallel with the axis of journals 23 through which the support arm extends. Switch actuating arm 40 may thus be roughly located to be vertically tilted by means of rod 34 so that switch 39 will make contact when the float 35 is shifted upwardly by the liquid 27. However, it is necessary that the switches make and break contacts at minute selective positions and, to accomplish this, it is necessary to very closely adjust the surface level of the liquid 27. An effective way of accomplishing this adjustment is to place a manually operable displacement member 44 so that its plunger 46 is movable into and out of the liquid body thereby effecting the desired adjustment.

Figure 6:
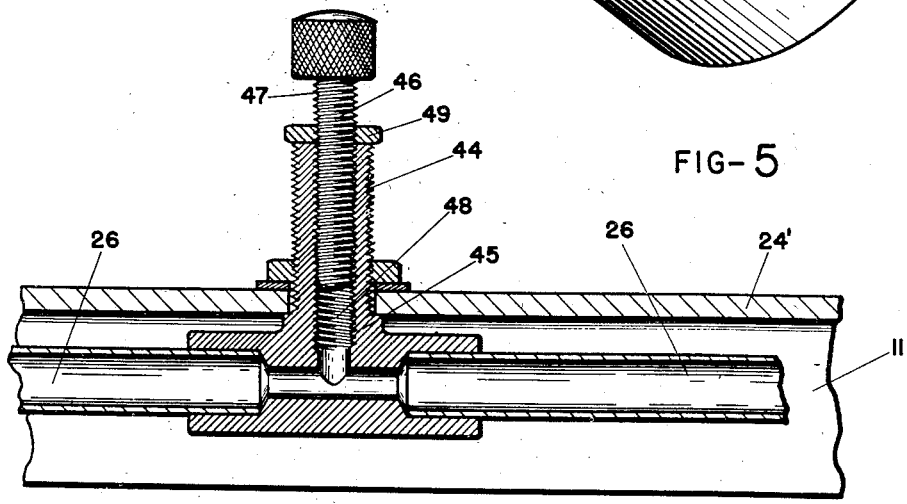
Figure 6 is a vertical longitudinal cross section taken upon an enlarged scale and showing the manually operable displacement member for selectively adjusting the liquid level in the reservoirs.

The displacement member is detailed in Figure 6 as being a T-connection 45 interposed the conduit 26 and having the displacement plunger 46 shiftable into and out of one segment of the T-member 45 for displacing the liquid. The plunger 46 is shown as having external threads 47 cooperating with internal threads 48 of the T and a lock nut 49 for releasably securing the plunger in a selected position.

To further enhance the ability of the device to actuate a leveling mechanism of mobile equipment, it is desired that the pendulous frame be permitted to assume a vertical position longitudinally of the equipment or laterally of the swivel axis. Also, it is desirable that the longitudinal swivel movement be arrested and I have therefore provided an arrestor indicated in general by the numeral 50 which is pivotally secured at 51 to a structural member 57 of the mobile equipment 22 and has its piston rod 53 secured at 52 to the frame 11 by loose nuckle joint. The piston rod 53 is secured to a piston 54 slidable within the cylinder 55 having front and rear restricted vents 56 to decelerate the swivel movement of the frame 11.

Having thus described my invention, I claim:

1. A level sensitive switch actuator comprising a pendulous frame swivel-mounted on a normally horizontal fixed axis disposed parallel with the plane to tilt to be corrected; an arrestor operably connected to said frame to decelerate its swivel movement about said axis; a pair of reservoirs carried by the frame and spaced from each other parallel to said axis; a conduit communicating the reservoirs at substantially their lower ends; liquid in said reservoirs and conduit; means employing the displacement principle for selectively varying the surface level of said liquid in said reservoir; a vertically and horizontally adjustable support arm supported relative to each reservoir; a vertically tiltable switch actuating arm pivotally carried by each support arm; a float in each reservoir and supported by said liquid; a vertical rod supported coaxial with each float and extending upwardly through a reduced aperture in the cover of said reservoir and engaging said switch actuating arm at a selectively adjustable point spaced from its pivot; and a concavo-convex resilient cup encircling the rod and supported upon said float and engageable with the cover of said reservoir to seal against leakage about the rod when the liquid level is raised above normal.

2. A level sensitive switch actutor comprising a pendulous frame swivel-mounted on a normally horizontal fixed axis disposed parallel with the plane of tilt to be corrected; an arrestor operably connected to decelerate the swivel movement of said frame; a pair of reservoirs carried by the frame and spaced from each other parallel to said axis; a conduit communicating the reservoirs at substantially their lower ends; liquid in said reservoirs and conduit; means employing the displacement principle for selectively varying the surface level of said liquid in said reservoirs; a vertically and horizontally adjustable support arm supported relative to each reservoir; a vertically tiltable switch actuating arm pivotally carried by each support arm; a float in each reservoir and supported by said liquid; and a vertical rod supported coaxial with each float and extending upwardly of said reservoir and engaging said switch actuating arm at a selectively adjustable point spaced from its pivot.

3. A level sensitive switch actuator comprising a pendulous frame swivel-mounted on a normally horizontal fixed axis disposed parallel with the plane of tilt to be corrected; an arrestor operably connected to decelerate the swivel movement of said frame; a pair of reservoirs spaced from each other parallel to said axis; a conduit communicating the reservoirs at substantially their lower ends; liquid in said reservoirs and conduit; displacement means for selectively varying the surface level of said liquid in said reservoirs; a vertically and horizontally adjustable support arm supported relative to each reservoir; a vertically tiltable switch actuating arm pivotally carried by each support arm; and a flot in each reservoir and supported by said liquid; said floats being operably connected to shift their respective switch actuating arm in the course of tilting movement of said frame.

4. The invention as defined in claim 3 wherein the floats each have a conical upper face and radially disposed undulations on its lower face.

5. In a level sensitive switch actuator for mobile equipment the combination with a pendulous frame swivel-mounted on a normally horizontal fixed axis supported on the equipment and disposed parallel with the plane of tilt to be corrected and having an arrestor to decelerate its swivel movement; of a pair of reservoirs supported on the frame and spaced from each other parallel to said axis and containing switch actuating floats; a conduit intercommunicating said reservoirs; a liquid confined in said reservoirs and conduit and supporting said floats and free flowing to seek a level in the course of tilting movement of said equipment; and a manually operable displacement member movable into and out of the liquid body to provide means for selectively adjusting the liquid level in the reservoirs.

6. In a level sensitive switch actuator for mobile equipment the combination with a pendulous supporting frame swivel mounted on a normally horizontal fixed axis disposed parallel with the plane of tilt to be corrected; a movement arrestor operably connected to decelerate the swinging movement of said frame; of a pair of reservoirs carried by the frame and spaced from each other along said axis; means intercommunicating said reservoirs below the normal liquid level; a free-flowing liquid in said reservoirs and intercommunicating means and free to flow to seek a level in the course of tilting movement of said equipment; and a solid material float in each reservoir and supported in concentric relation to the respective reservoir for free floating movement as effected by changes of the liquid level therein; said floats having a specific gravity of not less than 15 percent of the specific gravity of said liquid.

References Cited in the file of this patent

UNITED STATES PATENTS

| | | |
|---|---|---|
| Re. 21,194 | Blanchett | Sept. 5, 1939 |
| 1,760,382 | Teesdale | May 27, 1930 |
| 1,835,007 | Brannen | Dec. 8, 1931 |
| 1,915,462 | Zuckschwerdt | June 27, 1933 |
| 2,101,837 | Blanchett | Dec. 14, 1937 |
| 2,266,103 | Van Guilder | Dec. 16, 1941 |
| 2,564,081 | Schilling | Aug. 14, 1951 |